United States Patent
Qiu et al.

(10) Patent No.: US 12,347,146 B2
(45) Date of Patent: Jul. 1, 2025

(54) LENS, PHOTOGRAPHING DEVICE, PROCESSING METHOD, DEVICE AND STORAGE MEDIUM FOR LENS HUMIDITY

(71) Applicant: FAURECIA CLARION ELECTRONICS (XIAMEN) CO., LTD., Xiamen (CN)

(72) Inventors: Jie Qiu, Xiamen (CN); Chen Shen, Xiamen (CN); Yaping Wu, Xiamen (CN)

(73) Assignee: FAURECIA CLARION ELECTRONICS (XIAMEN) CO., LTD., Xiamen (CN)

( * ) Notice: Subject to any disclaimer, the term of this patent is extended or adjusted under 35 U.S.C. 154(b) by 259 days.

(21) Appl. No.: 18/347,577

(22) Filed: Jul. 6, 2023

(65) Prior Publication Data

US 2024/0013440 A1    Jan. 11, 2024

(30) Foreign Application Priority Data

Jul. 6, 2022    (CN) .......................... 202210798372.8

(51) Int. Cl.
| | |
|---|---|
| *G06T 7/90* | (2017.01) |
| *G02B 27/00* | (2006.01) |
| *H04N 23/50* | (2023.01) |
| *B60S 1/02* | (2006.01) |
| *B60S 1/56* | (2006.01) |
| *H04N 5/262* | (2006.01) |

(52) U.S. Cl.
CPC ............ *G06T 7/90* (2017.01); *G02B 27/0006* (2013.01); *H04N 23/50* (2023.01); *B60S 1/023* (2013.01); *B60S 1/56* (2013.01); *G06T 2207/10024* (2013.01); *H04N 5/2628* (2013.01)

(58) Field of Classification Search
CPC ........ B60S 1/023; B60S 1/56; G02B 27/0006; G06T 2207/10024; G06T 2207/30252; G06T 7/90; H04N 23/50; H04N 5/2628
See application file for complete search history.

(56) References Cited

U.S. PATENT DOCUMENTS

| | | | | |
|---|---|---|---|---|
| 2011/0280599 A1* | 11/2011 | Ino | ..................... | G03G 15/5033 |
| | | | | 399/49 |
| 2016/0178440 A1* | 6/2016 | Uno | ........................ | G01J 5/027 |
| | | | | 356/43 |

* cited by examiner

*Primary Examiner* — Antoinette T Spinks
(74) *Attorney, Agent, or Firm* — Kilpatrick Townsend & Stockton LLP

(57) ABSTRACT

The present disclosure provides a lens, a photographing device, as well as a processing method, a device and a storage medium for lens humidity. The lens includes a lens body and a humidity sensitive color changing film. The humidity sensitive color changing film is attached to a detection area of a photographing surface of the lens body, and changes color when its humidity is greater than a humidity threshold, to change color of image corresponding to the detection area in a photographed image. By configuring the humidity sensitive color changing film, the present disclosure can efficiently and accurately detect the presence of interference factors, such as water and frost, on surface of the lens at a low cost, thereby facilitating the start and stop control of dewatering/defrosting function, and preventing these external interference factors from adversely affecting the clarity and accuracy of images photographed by an in-vehicle camera.

14 Claims, 3 Drawing Sheets

LENS, PHOTOGRAPHING DEVICE, PROCESSING METHOD, DEVICE AND STORAGE MEDIUM FOR LENS HUMIDITY

FIELD

The present disclosure relates to a lens, a photographing device, a method for processing lens humidity, a device for processing lens humidity, and a computer-readable storage medium.

BACKGROUND

In-vehicle cameras are widely used in various driving assistance systems such as reverse imaging, 360° panoramic imaging and autonomous driving, providing many conveniences for users while driving and ensuring their driving safety. In order to prevent external interference factors, such as rain and frost, from adversely affecting the clarity and accuracy of images photographed by in-vehicle cameras, existing technologies have proposed some water/frost detection proposals to maintain the normal use of in-vehicle cameras in various interference environments. However, existing water/frost detection techniques are carried out mainly based on methods of temperature detection, image distortion comparison and so on, which generally have defects such as high hardware costs, complex software algorithms, lack of objective standards, and low detection accuracy.

In order to overcome the defects of existing technologies, a processing technology for lens humidity is urgently need in this field, for efficiently and accurately detecting the presence of interference factors, such as water and frost, on surface of the lens at a low cost, thereby facilitating the start and stop control of dewatering/defrosting function, and preventing these external interference factors from adversely affecting the clarity and accuracy of images photographed by an in-vehicle camera.

SUMMARY

A brief overview of embodiments provided below to provide a basic understanding of these embodiments. The summary is not an exhaustive overview of all embodiments envisaged, and is neither intended to identify the key or decisive elements of all embodiments nor to attempt to define the scope of any or all embodiments. The sole purpose of the summary is to present some concepts of one or more embodiments in a simplified form as a prelude to the more detailed description that is presented later. In order to overcome the defects of existing technologies, the present disclosure provides a lens, a photographing device, a processing method for lens humidity, a processing device for lens humidity and a computer-readable storage medium, for efficiently and accurately detecting the presence of interference factors, such as water and frost, on surface of the lens at a low cost, thereby facilitating the start and stop control of dewatering/defrosting function, and preventing these external interference factors from adversely affecting the clarity and accuracy of images photographed by an in-vehicle camera.

In one embodiment, according to some embodiments of the present disclosure, the lens includes a lens body and a humidity sensitive color changing film. The humidity sensitive color changing film is attached to a detection area of a photographing surface of the lens body, and changes color when its humidity is greater than a humidity threshold, to change color of image corresponding to the detection area in a photographed image.

Further, in some embodiments of the disclosure, the photographing surface consists of a display area corresponding to a standard display resolution at a center position of a front surface of the lens body, and a redundant area corresponding to redundant pixels at an edge position of the front surface of the lens body. The detection area is located in the redundant area.

Further, in some embodiments of the disclosure, the photographing surface consists of a user focus area at a center position of a front surface of the lens body, and a non focus area at an edge position of the front surface of the lens body. The detection area is located in the non focus area.

Further, in some embodiments of the disclosure, the lens further includes a heating element. The heating element is activated according to color changing state of the humidity sensitive color changing film, to reduce the humidity of the photographing surface of the lens body.

Further, in some embodiments of the disclosure, the heating element includes a heating wire. The heating wire is combined with a humidity sensitive material to form a humidity sensitive color changing film with the heating wire, and attached to the detection area of the lens body. Or, in some embodiments, the heating element includes a heating soft substrate. The heating soft substrate is arranged in a circular shape, and attached to a side surface of the lens body in a surrounding manner. Or, in some embodiments, the heating element includes a transparent heating substrate. The transparent heating substrate is attached to the humidity sensitive color changing film in the detection area.

Further, in some embodiments of the disclosure, the lens further includes a waterproof film. The waterproof film is attached to the humidity sensitive color changing film, exposing the detection area of the humidity sensitive color changing film, and covering rest area of the humidity sensitive color changing film.

In addition, according to the embodiments of the present disclosure, the photographing device includes a lens and an image sensor. The lens is selected from any of the lenses provided in the embodiments of the present disclosure. The image sensor simultaneously collects a first image of a display area at a center position and a second image of a detection area at an edge position through a photographing surface of the lens, sends the first image to a display device for displaying, and sends the second image to a humidity detection module for humidity detection.

Further, in some embodiments of the disclosure, the photographing device further includes the humidity detection module. The humidity detection module is configured as: obtaining and analyzing the second image to determine whether there is a preset color deviation, and the preset color deviation corresponds to a color of the humidity sensitive color changing film when its humidity is greater than a humidity threshold; and in response to a result of the preset color deviation in the second image, determining that there is water and/or frost on the surface of the lens.

Further, in some embodiments of the disclosure, the photographing device further includes a dehumidification module. The dehumidification module is configured as: in response to a result of water and/or frost on the surface of the lens, activating dehumidification function to reduce humidity of the photographing surface of the lens. Herein, the dehumidification function is implemented based on a heating element.

In addition, according to the embodiments of the present disclosure, the processing method for lens humidity includes following steps: obtaining an image of a detection area through a photographing surface of a lens, and a humidity sensitive color changing film is attached to the detection area, and the humidity sensitive color changing film changes color when its humidity is greater to a humidity threshold, to change color of the image; analyzing the image to determine whether there is a preset color deviation in the image, and the preset color deviation corresponds to the color of the humidity sensitive color changing film when its humidity is greater than the humidity threshold; and in response to a result of the preset color deviation in the second image, determining that there is water and/or frost on the surface of the lens.

Further, in some embodiments of the disclosure, the steps of obtaining an image of a detection area through a photographing surface of a lens includes: collecting a complete third image through the photographing surface of the lens; and cutting a display area of corresponding size at a center position of the third image, according to standard display resolution of a display device and/or a user focus area, to obtain a first image, and determining a second image of the detection area according to a redundant area and/or a non focus area remaining at an edge position.

Further, in some embodiments of the disclosure, the processing method further includes following steps: in response to a result of water and/or frost on the surface of the lens, activating dehumidification function to reduce humidity of the photographing surface of the lens. Herein, the dehumidification function is implemented based on a heating element.

In addition, according to the embodiments of the present disclosure, the processing device for lens humidity includes a memory and a processor. The processor is connected to the memory and configured to implement the processing method for lens humidity according to the embodiments of the present disclosure.

In addition, according to the embodiments of the present disclosure, the computer-readable storage medium, in which computer instructions are stored. When the computer instructions are executed by a processor, the processing method for lens humidity according to the embodiments of the present disclosure.

BRIEF DESCRIPTION OF THE DRAWINGS

After reading the detailed description of the disclosed embodiments in conjunction with the following drawings, it is possible to better understand the above embodiments of the present disclosure. In the accompanying drawings, each component may not necessarily be drawn to scale, and components with similar related characteristics or features may have the same or similar reference numerals.

DETAILED DESCRIPTION OF EMBODIMENTS

Figure 1:
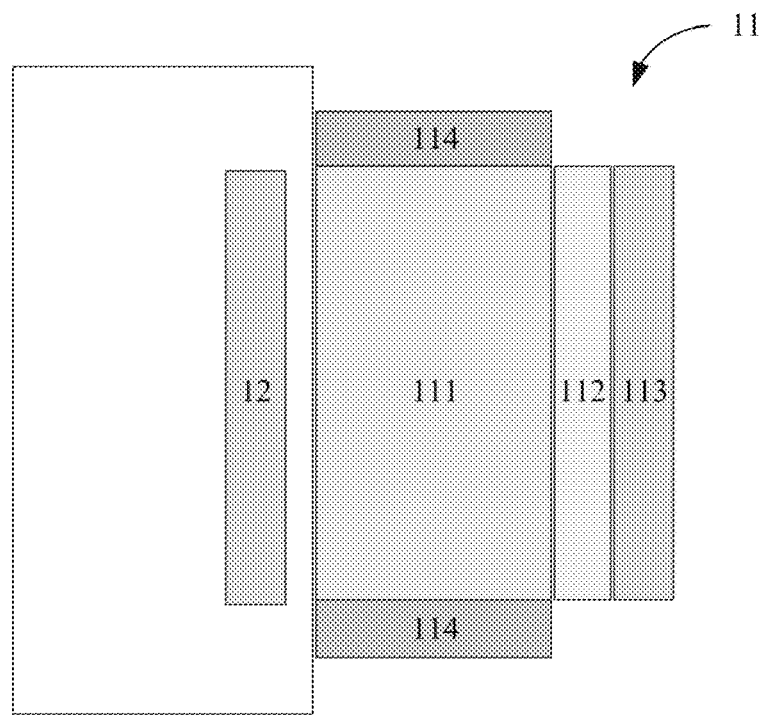
FIG. 1 shows a structural schematic diagram of a photographing device provided according to some embodiments of the present disclosure.

The implementations of the present disclosure are described below by specific embodiments. Embodiments of the present disclosure from the contents disclosed in the description. Although the description of the present disclosure is introduced together with some embodiments, it does not mean that the features of the present disclosure are limited to the embodiments. On the contrary, the purpose of introducing the present disclosure in combination with the embodiments is to cover other embodiments that may be extended based on the claims of the present disclosure. In order to provide a deep understanding of the present disclosure, the following description will contain many specific details. The present disclosure can also be implemented without using these details. In addition, in order to avoid confusion or ambiguity of the key points of the present disclosure, some specific details is omitted in the description.

In the description of the present disclosure, it should be noted that, unless otherwise specified and defined, the terms "installation", "connecting" and "connection" should be understood in a broad sense. For example, they can be fixed connection, removable connection or integrated connection; mechanical connection or electrical connection; as well as direct connection, indirect connection through intermediate media or internal connection of two components. The specific meaning of the above terms in the present disclosure can be understood in specific cases.

In addition, the words "up", "down", "left", "right", "top", "bottom", "horizontal" and "vertical" used in the following description should be understood as the orientation shown in this paragraph and the relevant drawings. This relative term is only for convenience of explanation, and does not mean that the described device needs to be manufactured or operated in a specific direction, so it should not be understood as a limitation of the present disclosure.

It is understood that although the terms "first", "second", "third", etc. can be used here to describe various components, regions, layers and/or parts, these components, regions, layers and/or parts should not be limited by these terms, and these terms are only used to distinguish different components, regions, layers and/or parts. Therefore, a first component, area, layer and/or part discussed below can be referred to as a second component, area, layer and/or part without departing from some embodiments of the present disclosure.

As mentioned above, existing water/frost detection techniques are carried out mainly based on methods of temperature detection, image distortion comparison and so on, which generally have defects such as high hardware costs, complex software algorithms, lack of objective standards, and low detection accuracy. In order to overcome the defects of existing technologies, present disclosure provides a lens, a photographing device, a processing method for lens humidity, a processing device for lens humidity and a computer-readable storage medium, for efficiently and accurately detecting the presence of interference factors, such as water and frost, on surface of the lens at a low cost, thereby facilitating the start and stop control of dewatering/defrosting function, and preventing these external interference factors from adversely affecting the clarity and accuracy of images photographed by an in-vehicle camera.

Firstly, please refer to FIG. 1. FIG. 1 shows a structural schematic diagram of a photographing device provided according to some embodiments of the present disclosure.

In the embodiment shown as FIG. 1, the photographing device provided by the embodiments of the present disclosure may include a lens 11 provided by the embodiments of the present disclosure, as well as an image sensor 12. The lens 11 is installed in front of a sensing surface of the image sensor 12 and is used for one or more optical processing, such as zooming in, zooming out and focusing, on the image of external sensing object. The image sensor 12 can use an intensified charge coupled device (ICCD), obtaining optical signal of the external sensing object through the lens 11 and carrying out exposure processing to capture the image of the external sensing object.

Further, the lens 11 can be included of an optical device body 111 and a humidity sensitive color changing film 112 attached to a detection area of a photographing surface (i.e. the surface facing the photographed object) of the body 111. The humidity sensitive color changing film 112 can be made of humidity sensitive color changing materials, such as color changing silicone, sodium peroxide, anhydrous copper sulfate etc., changing color when its humidity is greater than a humidity threshold, to change color of image corresponding to the detection area in a photographed image.

Figure 2:
FIG. 2 shows a schematic diagram of a detection area provided according to some embodiments of the present disclosure.
Figure 3:
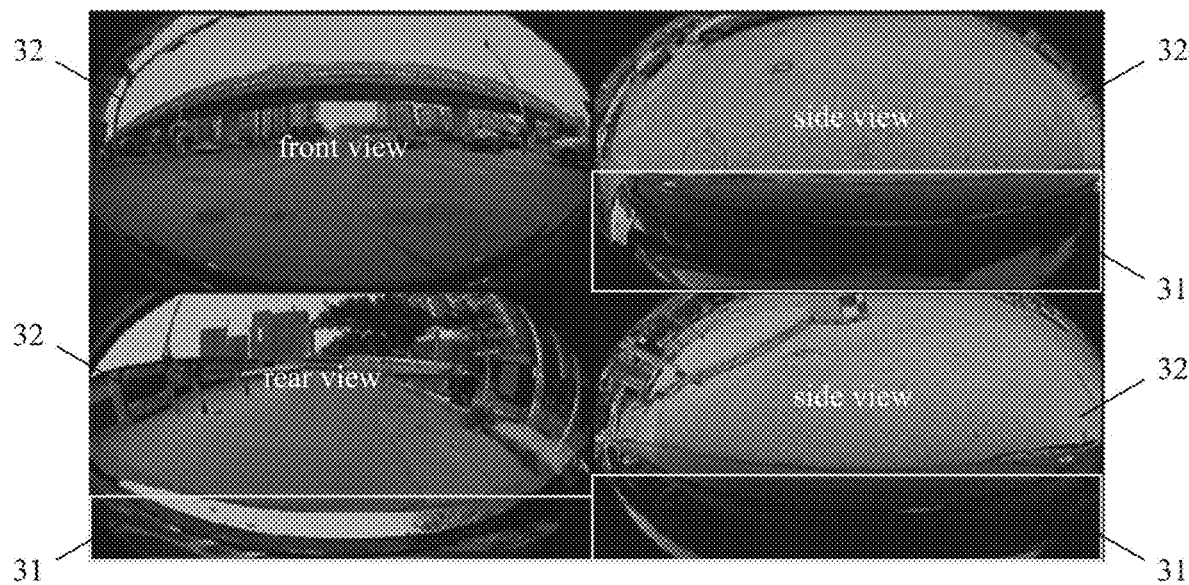
FIG. 3 shows a schematic diagram of a detection area provided according to some embodiments of the present disclosure.

In some embodiments, for the humidity sensitive color changing film 112 made of non transparent materials such as color changing silicone, its attached detection area can be determined according to the standard display resolution of the display device and/or the user daily focus area. Please refer to FIG. 2 and FIG. 3 respectively. FIG. 2 shows a schematic diagram of a detection area provided according to some embodiments of the present disclosure. FIG. 3 shows a schematic diagram of a detection area provided according to some embodiments of the present disclosure.

In some embodiments, the image sensor 12 is connected to a system on chip (SOC) of systems such as vehicle reversing image, automatic driving etc., and outputs images according to the standard video format specified by the SOC. Herein, the effective number of pixels of the image sensor 12 is generally greater than the actual number of output pixels. For example, the image sensor 12 used for electronic rear view mirrors can choose an OX03C10 with 2M pixels, whose effective pixel matrix is 1936×1296, and whose maximum effective pixel output is 1920×1280. However, considering the uniformity of video formats, the resolution of standard video formats is generally set to 1920×1080. In this way, as shown in FIG. 2, 216 rows of redundant pixels will be produced at the edge position of a complete third image, which is collected by the image sensor 12 through the photographing surface of lens 11, and will account for 16% of the entire image resolution. In order to avoid the negative impact on the displayed image, such as shielding and color deviation, caused by the humidity sensitive color changing film 112 made of non transparent materials, in conditions without considering zooming, the humidity sensitive color changing film 112 can be attached to an absolute redundancy area 21 corresponding to redundant pixels on the edge position of the front surface of the lens body 111, and exposes a display area 22 corresponding to the standard display resolution on the center position of the front surface of the lens body 111. Further, in conditions considering the zooming of the image sensor 12 output image by the vehicle system, the vehicle system can also select an area within the range of the display area 22 in FIG. 2 for zooming in and displaying, according to a preset zooming ratio. In this way, when the system is not in use, the remaining areas in the display area 22 can also be treated as redundant areas for lamination, and used as relatively redundant areas. Afterwards, the image sensor 12 can send the first image collected through the display area 22 to display devices of the vehicle, such as central control display screen, for display, and send the second image collected through the absolute redundancy area 21 and/or relative redundancy area to the humidity detection module for humidity detection, to carry out humidity detection based on color deviation, without affecting the display quality and avoiding the addition of additional functional devices and wiring.

In the embodiment shown as FIG. 3, for the image sensor 12 connected to an around view monitoring (AVM) system of a vehicle, the display content thereof includes images such as the rear and the doors of the vehicle, etc. that are not of concern to the user. Due to this area is only used for confirming the edge information of the vehicle, there is not a high requirement for the color of the area, and it can be defined as a non focus area 31. In this way, the humidity sensitive color changing film 112 can be attached to the non focus area 31 at edge position of the front surface of the lens body 111, where images of rear and doors of the vehicle are located, and exposes the user focus area 32 at center position of the front surface of the lens body 111, where images of roads, obstacles, etc. are located. Image sensor 12 can send the first image, collected through the focus area 32, to the central control display screen and other display devices of the vehicle for display, and send the second image, collected through the non focus area 31, to the humidity detection module for humidity detection, to carry out humidity detection based on color deviation, without affecting normal observation of road conditions of the user.

In some other embodiments, for a humidity sensitive color changing film 112 made of transparent material with high transparency, it can also be applied to the entire front surface of the lens body 111. In this way, the humidity sensitive color changing film 112 can remain transparent in a dry state, and changes color at a corresponding area when there are interference factors such as water and frost at any one or more positions on the front surface, and fully representing whether there are interference factors such as water and frost at any area of the lens 11, to facilitate the start and stop control of dewatering/defrosting function, and prevent these external interference factors from adversely affecting the clarity and accuracy of images photographed by an in-vehicle camera.

Figure 4:
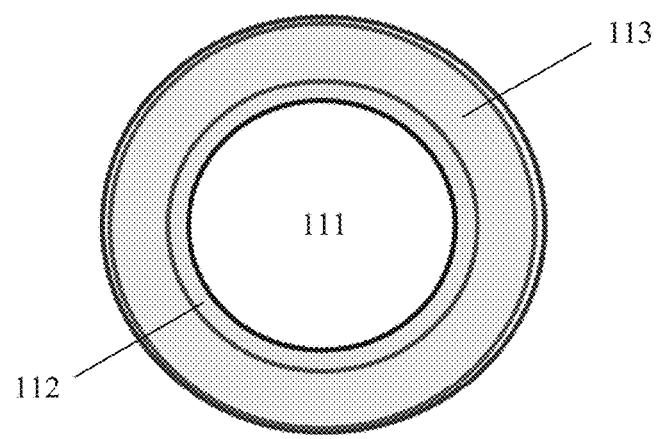
FIG. 4 shows an installation schematic diagram of a protective film provided according to some embodiments of the present disclosure.

In addition, please refer to FIG. 1 and FIG. 4. FIG. 4 shows an installation schematic diagram of a protective film provided according to some embodiments of the present disclosure.

As shown in FIG. 1 and FIG. 4, in some embodiments of the present disclosure, the lens 11 can also be configured with a waterproof film 113. The waterproof film 113 can be attached above the humidity sensitive color changing film 112, and in a circular shape with an inner diameter larger than the humidity sensitive color changing film 112, to expose the portion of the humidity sensitive color changing film 112 located in the detection area and cover the rest portion of humidity sensitive color changing film 112. By isolating the rest portion of the humidity sensitive color changing film 112 from contacting with water vapor in the air via covering waterproof film 113, the present disclosure can effectively reduce the color changing phenomenon of the humidity sensitive color changing film 112 caused by excessive environmental humidity, and reduce misjudgment caused by the color changing of the humidity sensitive color changing film 112.

Figure 5:
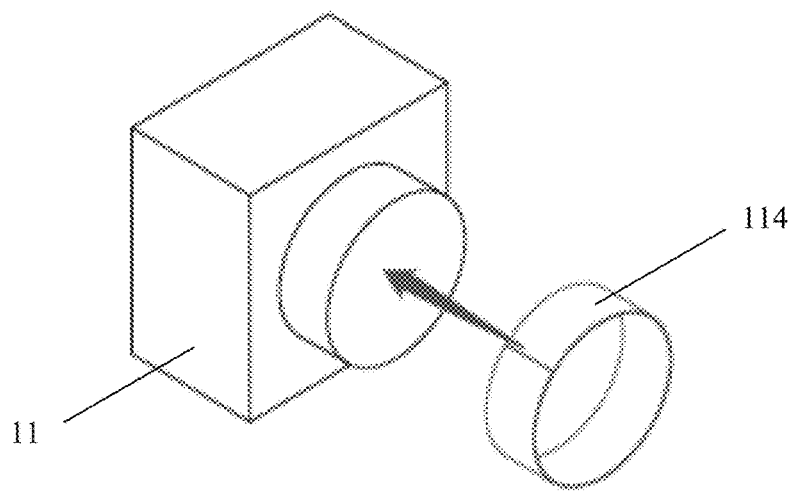
FIG. 5 shows an installation schematic diagram of a heating soft substrate provided according to some embodiments of the present disclosure.

In addition, please refer to FIG. 1 and FIG. 5. FIG. 5 shows an installation schematic diagram of a heating soft substrate provided according to some embodiments of the present disclosure.

As shown in FIG. 1 and FIG. 5, in some embodiments of the present disclosure, a heating element can also be configured in the lens 11. In one embodiment, the heating element can use a heating soft substrate 114 made of flexible printed circuit (FPC). By means of head and tail welding, the heating soft substrate 114 can be arranged in a circular shape adapted to the diameter of the lens body 111, and attached to a side surface of the lens body 111 in a surrounding manner, for heating the body 111 to reduce the humidity of the photographing surface thereof.

The heating soft substrate 114 attached to the side surface of the lens body 111 in a surrounding manner only provides some non-limiting implementations of the present disclosure, which is intended to clearly display the main idea of the present disclosure, and provide some specific proposals that are convenient for the public to implement, rather than limiting the scope of protection of the present disclosure.

In some other embodiments, the heating element can also be included by one or more heating wires. In one embodiment, technicians can powder and fuse color changing silicone, sodium peroxide, anhydrous copper sulfate, and other humidity sensitive color changing materials into a glue material with one or more electric heating wires, and solidify them into a thin film shape to obtain a humidity sensitive color changing film 112 with heating wires. Afterwards, technicians can stick or coat the humidity sensitive color changing film 112 with heating wires to the detection area of the photographing surface of the lens body 111, thereby also achieving the effect of heating the body 111 to reduce the humidity of the photographing surface thereof.

In some other embodiments, the heating element can also use a transparent heating substrate made of transparent material. The transparent heating substrate can be attached to the humidity sensitive color changing film 112 in the detection area of the lens body 111 by means of sticking, coating, etc., thereby also achieving the effect of heating the body 111 to reduce the humidity of the photographing surface thereof.

The working principle of the above photographing device will be described below in conjunction with some embodiments of processing methods for lens humidity. In some non-limiting embodiments, the processing method for lens humidity provided by the embodiments of the present disclosure can be implemented by the processing device for lens humidity provided by the embodiments of the present disclosure. In one embodiment, the processing device can be configured in the photographing device provided by the embodiments of the present disclosure by form of a software program and/or hardware device, and is configured with a memory and a processor therein. The memory includes, but is not limited to, the computer-readable storage medium provided by the embodiments of the present disclosure, on which computer instructions are stored. The processor is connected to the memory, and configured to execute the computer instructions stored on the memory to implement the above processing methods for lens humidity provided by the embodiments of the present disclosure.

Figure 6:
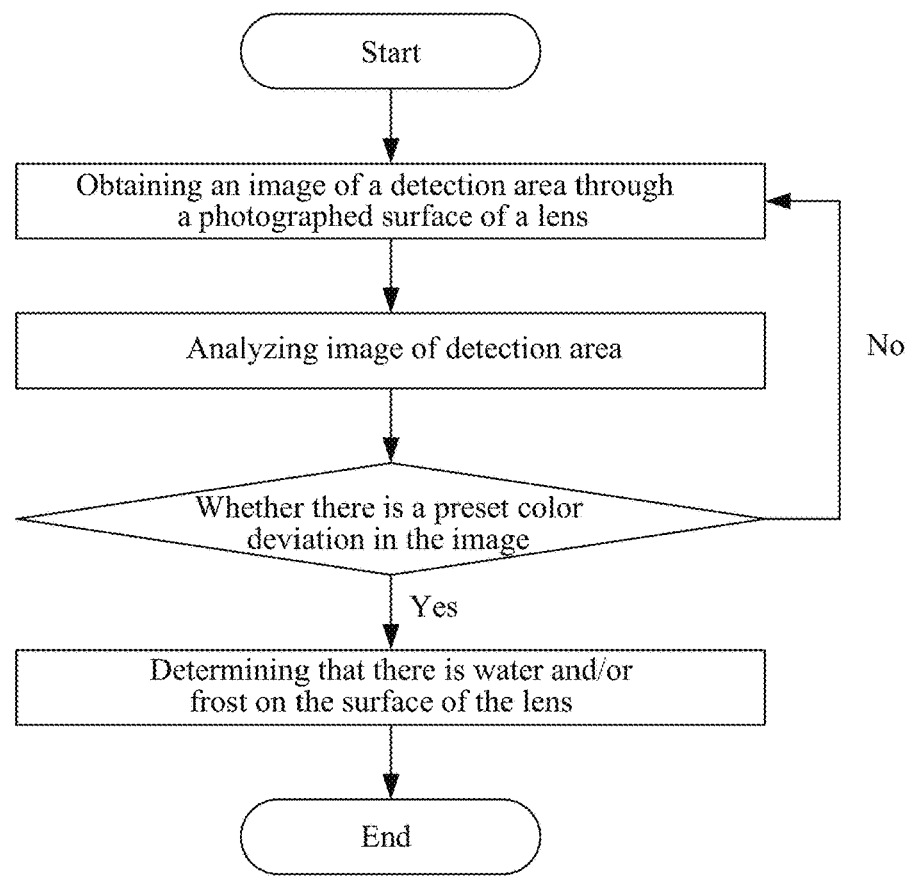
FIG. 6 shows a flowchart of a processing method for lens humidity provided according to some embodiments of the present disclosure.

Please refer to FIG. 6. FIG. 6 shows a flowchart of a processing method for lens humidity provided according to some embodiments of the present disclosure.

As shown in FIG. 6, in the process of detecting and controlling lens humidity, the processing device for lens humidity can first obtain a second image of the detection area 21 through the photographing surface of the lens 11.

In one embodiment, in the process of obtaining the second image of the detection area 21, the image sensor 12 configured in the photographing device can first collect a complete third image that include all effective pixel outputs (e.g. 1920×1280) through the photographing surface of the lens 11. As mentioned above, the complete third image includes both the first image of the display area 22 at the center position, and the second image of the detection area 21 at the edge position. Afterwards, the lens humidity processing device can obtain the third image through the image sensor 12, cut the display area 22 of corresponding size at the center position of the third image according to the standard display resolution (e.g. 1920×1080) of the display device and/or the user focus area, to obtain the first image, and determine the second image of the detection area 21 according to the redundant area and/or the non focus area remaining at the edge position. Afterwards, the image sensor 12 can send the first image to the display device for normal display, and send the second image processed by the humidity sensitive color changing film 112 to the humidity detection module for humidity detection. Herein, the humidity detection module can be a software module configured in the processing device, for obtaining and analyzing the second image to determine whether there is a preset color deviation.

In response to the determination result of no preset color deviation in the second image, the humidity detection module can determine that there is no interference factor of water or frost on the photographing surface of lens 11, thereby continuing to obtain the second image of detection area 21 to achieve real-time detection of lens humidity. On the contrary, in response to the determination result of the preset color deviation in the second image, the humidity detection module can output a warning signal that there is water and/or frost on the photographing surface of lens 11.

Further, in some embodiments, in response to the warning signal of water and/or frost on the photographing surface of the lens 11, the dehumidification module configured in the processing device can subsequently activate the dehumidification function, driving the heating element 114 attached to the lens 11 to reduce the humidity of the photographing surface of the lens 11.

The above proposals of achieving dehumidification function through heating element 114 only provide some non-limiting implementations of the present disclosure, which is intended to clearly display the main idea of the present disclosure, and provide some specific proposals that are convenient for the public to implement, rather than limiting the scope of protection of the present disclosure.

In some other embodiments, technicians can also configure blowing elements such as gas nozzles etc. on the photographing surface of lens 11 to achieve the same effects of water, mist and frost removal.

The processing method, processing device and storage medium for lens humidity applied to the lens, photographing device of vehicles only provide some non-limiting implementations of the present disclosure, which is intended to clearly display the main idea of the present disclosure, and provide some specific proposals that are convenient for the public to implement, rather than limiting the scope of protection of the present disclosure.

In other embodiments, technicians can also apply the lens, the photographing device, and the processing method, the processing device and the storage medium for lens humidity to various scenarios, such as road monitoring and access control monitoring, which are prone to interference conditions such as rain, mist, frost and snow, based on the concept of the present disclosure, to solve the corresponding problems, which will not be described here.

In summary, by attaching a humidity sensitive color change film 112 to the detection area of the photographing surface of the lens 11 and detecting the color of the image collected through the humidity sensitive color changing film 112, the lens, photographing device, processing method, processing device and storage medium for lens humidity provided by the present disclosure can efficiently and accurately detect the presence of interference factors, such as water and frost, on surface of the lens at a low cost, thereby facilitating the start and stop control of dewatering/defrosting function, and preventing these external interference factors from adversely affecting the clarity and accuracy of images photographed by an in-vehicle camera.

Although the above methods are illustrated and described as a series of actions in order to simplify the explanation, it should be understood and appreciated that these methods are not limited by the order of actions, because according to one or more embodiments, some actions can occur in different order and/or concurrently with other actions from the illustrations and descriptions herein or not illustrated and described herein.

Although the processing device described in the above embodiments can be implemented through a combination of software and hardware. However, it can be understood that the processing device can also be implemented separately in software or hardware. For hardware implementation, the processing device can be implemented in one or more application specific integrated circuits (ASICs), digital signal processors (DSPs), programmable logic devices (PLDs), field programmable gate arrays (FPGAs), processors, controllers, microcontrollers, microprocessors, other electronic devices used to perform the above functions, or a selected combination of the above devices. For software implementation, the processing device can be implemented through independent software modules such as procedures and functions running on a universal chip, and each module performs one or more of the functions and operations described in this article.

The various illustrative logic modules and circuits described in connection with the embodiments disclosed herein can be realized or executed by general-purpose processors, digital signal processors (DSPs), application specific integrated circuits (ASICs), field programmable gate arrays (FPGAs) or other programmable logic devices, discrete gate or transistor logic, discrete hardware components or any combination thereof designed to perform the functions described herein. The general processor can be a microprocessor, but in the alternative, the processor can be any conventional processor, controller, microcontroller or state machine. The processor can also be implemented as a combination of computing devices, such as a combination of DSP and microprocessors, microprocessors, one or more microprocessors cooperating with the DSP core or any other such configuration.

What is claimed is:

1. A lens, comprising:
    a lens body; and
    a humidity sensitive color changing film, wherein the humidity sensitive color changing film is attached to a detection area of a photographing surface of the lens body, and changes color when its humidity is greater than a humidity threshold, to change color of image corresponding to the detection area in a photographed image.

2. The lens according to claim 1, wherein the photographing surface consists of a display area corresponding to a standard display resolution at a center position of a front surface of the lens body, and a redundant area corresponding to redundant pixels at an edge position of the front surface of the lens body, wherein the detection area is located in the redundant area.

3. The lens according to claim 1, wherein the photographing surface consists of a user focus area at a center position of a front surface of the lens body, and a non focus area at an edge position of the front surface of the lens body, wherein the detection area is located in the non focus area.

4. The lens according to claim 1, further comprising:
    a heating element, wherein the heating element is activated according to color changing state of the humidity sensitive color changing film, to reduce the humidity of the photographing surface of the lens body.

5. The lens according to claim 4, wherein the heating element comprises a heating wire, which is combined with a humidity sensitive material to form a humidity sensitive color changing film with the heating wire, and attached to the detection area of the lens body, or
    the heating element comprises a heating soft substrate, which is arranged in a circular shape, and attached to a side surface of the lens body in a surrounding manner, or
    the heating element comprises a transparent heating substrate, which is attached to the humidity sensitive color changing film in the detection area.

6. The lens according to claim 1, further comprising:
    a waterproof film, wherein the waterproof film is attached to the humidity sensitive color changing film, exposing the detection area of the humidity sensitive color changing film, and covering rest area of the humidity sensitive color changing film.

7. A photographing device, comprising:
    the lens according to claim 1; and
    an image sensor, wherein the image sensor simultaneously collects a first image of a display area at a center position and a second image of a detection area at an edge position through a photographing surface of the lens, sends the first image to a display device for displaying, and sends the second image to a humidity detection module for humidity detection.

8. The photographing device according to claim 7, further comprising the humidity detection module, which is configured as:
    obtaining and analyzing the second image to determine whether there is a preset color deviation, wherein the preset color deviation corresponds to a color of the humidity sensitive color changing film when its humidity is greater than a humidity threshold; and
    in response to a result of the preset color deviation in the second image, determining that there is water and/or frost on the surface of the lens.

9. The photographing device according to claim 8, further comprising a dehumidification module, which is configured as:
    in response to a result of water and/or frost on the surface of the lens, activating dehumidification function to reduce humidity of the photographing surface of the lens, wherein the dehumidification function is implemented based on a heating element.

10. A processing method for lens humidity, comprising:
obtaining an image of a detection area through a photographing surface of a lens, wherein a humidity sensitive color changing film is attached to the detection area, and the humidity sensitive color changing film changes color when its humidity is greater to a humidity threshold, to change color of the image;
analyzing the image to determine whether there is a preset color deviation in the image, wherein the preset color deviation corresponds to the color of the humidity sensitive color changing film when its humidity is greater than the humidity threshold; and
in response to a result of the preset color deviation in a second image, determining that there is water and/or frost on the surface of the lens.

11. The processing method according to claim 10, wherein the steps of obtaining an image of a detection area through a photographing surface of a lens comprises:
collecting a complete third image through the photographing surface of the lens; and
cutting a display area of corresponding size at a center position of the third image, according to standard display resolution of a display device and/or a user focus area, to obtain a first image, and determining a second image of the detection area according to a redundant area and/or a non focus area remaining at an edge position.

12. The processing method according to claim 10, further comprising following steps:
in response to a result of water and/or frost on the surface of the lens, activating dehumidification function to reduce humidity of the photographing surface of the lens, wherein the dehumidification function is implemented based on a heating element.

13. A processing device for lens humidity, comprising:
a memory; and
a processor, wherein the processor is connected to the memory and configured to implement the processing method for lens humidity according to claim 10.

14. A computer-readable storage medium, in which computer instructions are stored, wherein when the computer instructions are executed by a processor, the processing method for lens humidity according to claim 10 is implemented.

* * * * *